Sept. 22, 1942.                G. L. MOORE ET AL                2,296,365
                                 LUBRICATING DEVICE
                               Filed Oct. 31, 1941            2 Sheets-Sheet 2
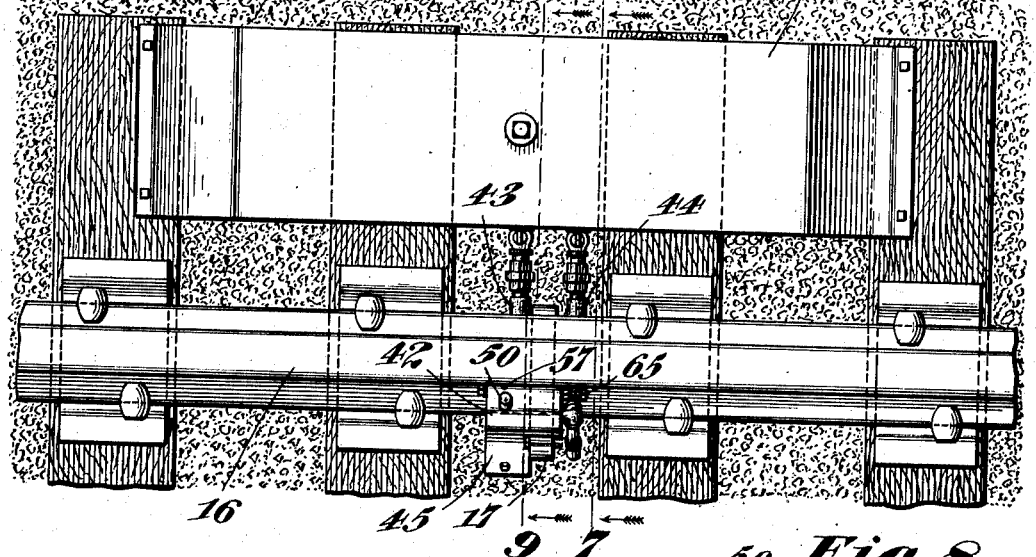
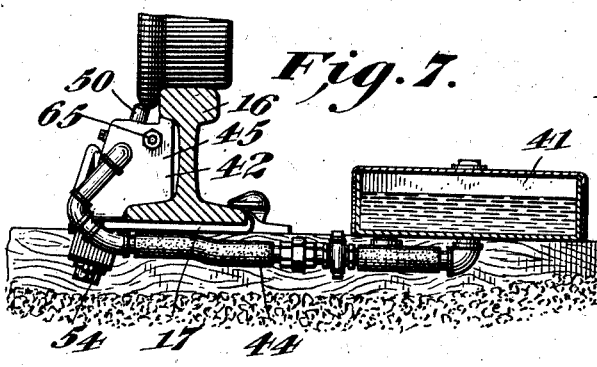
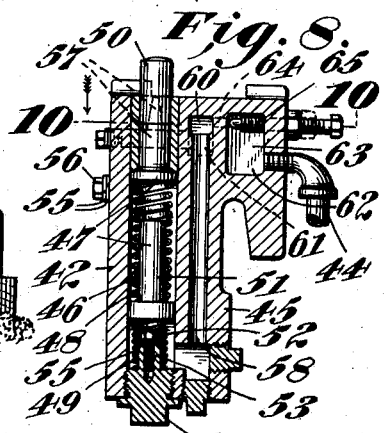
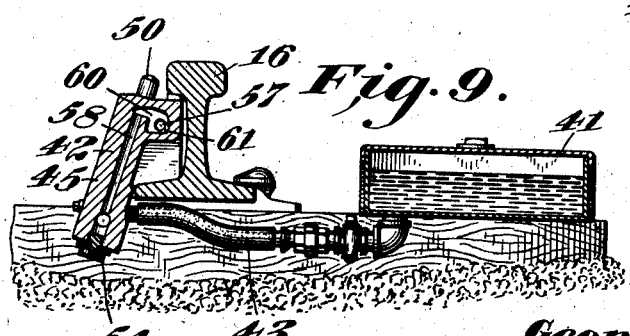
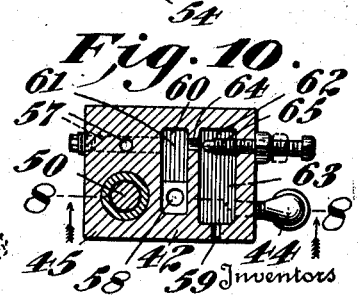
Inventors
George L. Moore
and James R. Steele.
By Warren M. Florance
Attorney Patented Sept. 22, 1942

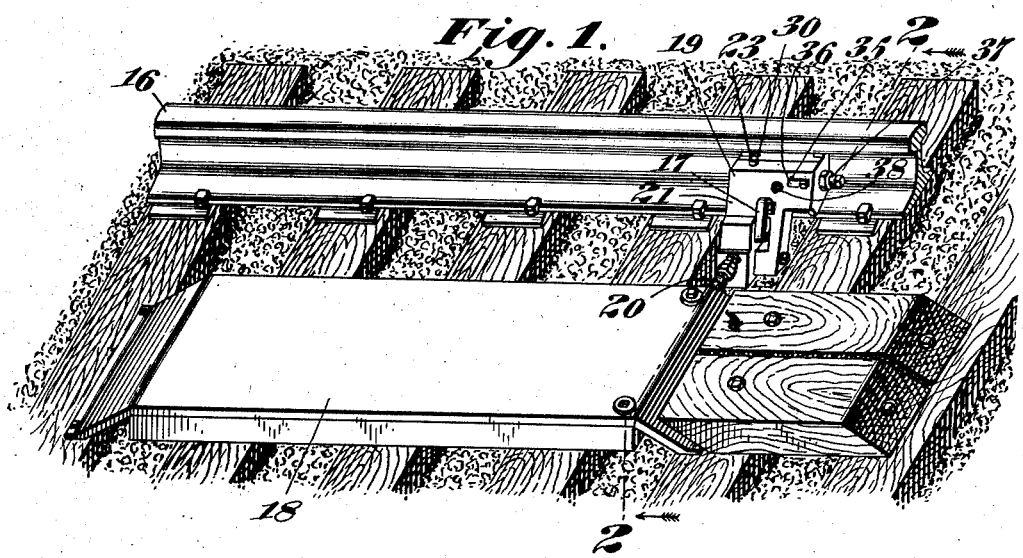

2,296,365

UNITED STATES PATENT OFFICE 2,296,365

LUBRICATING DEVICE

George Loop Moore and James Robert Steele, Owego, N. Y.

Application October 31, 1941, Serial No. 417,248

16 Claims. (Cl. 184—3)

Our invention relates to lubricating devices and more particularly to pneumatic rail and flange lubricators.

The lubricant devices of our invention, as shown in the drawings, each comprises a lubricant supply tank mounted on the ties of a railroad track structure and a lubricant distributor mounted in the fishing space of the rail by a spring clamp, the supply tank being connected to the lubricant distributor by means of a conduit. The lubricant distributor comprises a housing having a main chamber therein to which the lubricant is supplied from the lubricant supply through the conduit by gravity and which is in constant communication with the lubricant supply so that it is not necessary to provide movable parts such as valves to control the supply. Mounted within the housing of the distributor is a plunger which has its lower end projecting into the lubricant chamber and its upper end projecting to the outside of the housing to be operated towards its inward position by a car wheel passing over the rail to which the lubricator is attached. The plunger is biased to its outer position by a spring. Regulating means may be provided for the plunger.

The lubricator is also provided with an auxiliary lubricant chamber or sump within which a constant volume of lubricant is adapted to be maintained, which communicates with the main lubricant chamber by means of a suitable passage and which is shown located at a higher elevation than the level of the lubricant in the main chamber. A duct leading from the auxiliary chamber or sump to the outside of the lubricator provides a passage for the discharge of the lubricant from the lubricator onto the car wheels passing over the rail upon the operation of the plunger by said wheels. The lubricator also comprises pneumatic control means which comprises an air chamber and control means therefor. The control means for the air chamber comprises a control chamber communicating with the air chamber through a passage, the entrance to which is controlled by an adjustable control valve which is so adjustable that a predetermined amount of air is supplied to the air chamber. The pneumatic control is in communication with the auxiliary lubricant chamber and governs the volume and the height of the stream of lubricant discharged from the lubricator upon the operation of the plunger, and the lubricant discharged therefrom can be controlled to any predetermined degree by regulating the pressure in the air chamber through the manipulation of the adjustable control means therefor.

One object of our invention is to provide a lubricating device for automatically supplying a predetermined quantity of lubricant to the wheels of railway vehicles and the head of railroad track rails upon the passage of the wheels of the railway vehicle over the rails.

Another object of our invention is to provide a lubricating device which is easily installed and which is economical in service and which has a minimum of moving elements.

The novel features of our invention will be more fully understood from the following description and claims taken with the drawings, in which—

Figure 1 illustrates a section of a railroad track structure with a lubricating device embodying one form of our invention applied thereto;

Fig. 2 is a sectional view taken on the line 2—2 of Fig. 1;

Fig. 3 is a view, partly in section and partly in elevation, taken on the line 3—3 of Fig. 4;

Fig. 4 is a sectional view taken on the line 4—4 of Fig. 2;

Fig. 5 is a sectional view taken on the line 5—5 of Fig. 3;

Fig. 6 illustrates a section of a railroad track structure with a lubricating device embodying a modified form of our invention applied thereto;

Fig. 7 is a sectional view taken on the line 7—7 of Fig. 6;

Fig. 8 is a sectional view taken on the line 8—8 of Fig. 10;

Fig. 9 is a sectional view taken on the line 9—9 of Fig. 6; and

Fig. 10 is a sectional view taken on the line 10—10 of Fig. 8.

Referring to the drawings, 16 designates rails with which lubricating devices embodying our invention are shown assembled by means of the clamps 17.

Our improved lubricating device, as shown in Figures 1 to 5, inclusive, comprises a lubricant supply tank 18 and a lubricant distributing unit 19, which is shown connected to the lubricant supply 18 by means of the conduit 20. The lubricant distributor 19 comprises a housing 21, having a chamber 22, within which is operatively mounted a plunger 23, the lower end of which projects into the chamber 22. The plunger 23 is biased to its outer normal position by the spring 24. In this position the upper end of the plunger projects beyond the housing 21 into the path of the flanges of the wheels of a car passing over the rail 16, as shown in Figure 2. Adjusting washers 25 and 26 are provided for varying the stroke of the plunger 23, so that it will operate at its maximum efficiency under predetermined conditions. When the maximum stroke of the plunger 23 is required, the adjusting washers 25 and 26 are both placed under the spring 24. When the minimum stroke of the plunger 23 is required, the washers 25 and 26 are both placed on the plunger 23. When the medium stroke of the plunger 23 is required, the washers 25 and 26 are placed in the position shown in Figure 3 of the drawings, that is, one is placed on the plunger 23 and one under the spring 24.

The lubricant chamber 22 is so related with reference to the supply tank 18 that the lubricant from the tank 18 will flow by gravity through the conduit 20 into the chamber 22 beneath the plunger 23 when the plunger is in its biased position. Located in the distributor 19 is a pneumatic control which regulates the volume and height of lubricant ejected from the distributor upon the operation of the plunger 23. The pneumatic control comprises an air chamber 27, which communicates with the lubricant chamber 22 through the medium of the passage 28 and to the outside of the lubricator through the medium of the duct 30, and is provided with a sump 29 which is adapted to receive a supply of lubricant which is discharged from the duct 30 onto the car wheels and the rail upon the depression of the plunger 23. The volume and the height of the stream of lubricant discharged from the duct 30 onto the car wheels upon the depression of the plunger 23 depends upon the arrangement of the adjusting washers 25 and 26 on the plunger 23, and the position of the adjustable control for the air chamber 27, which comprises a control chamber 33, which communicates with the air chamber 27 through the passage 34. An adjustable air vent 35 communicates the chamber 33 with the atmosphere. A cap 36 is provided for adjusting the vent 35. An adjustable valve 37 is provided to control the volume of air passing from the chamber 33 through the passage 34 to the chamber 27. The valve 37 when completely closed will cause the stream of lubricant ejected from the duct 30 to attain its maximum height upon the depression of the plunger 23. To lower the height of the lubricant ejected from the duct 30, the valve 37 is opened until the required height is attained. After the correct height of the stream of lubricant ejected from the duct 30 is obtained and it is desired to give more body to the stream, the air vent 35, which is normally partially open, is closed a little by moving the cap 36 toward its closed position until the correct body of lubricant is ejected from the duct 30. If a stream of less body is desired, the air vent 35 is opened a little by moving the cap 36 toward its open position until the correct body of lubricant is ejected from the duct 30. A bleeder valve 38, which has a restricted opening therein communicates the chamber 27 with the atmosphere.

The lubricating device shown in Figures 7 to 10, inclusive, comprises a lubricant supply tank 41 and a lubricant distributing unit 42, which is shown connected to the lubricant supply tank 41 by means of the conduits 43 and 44. The lubricant distributor 42 comprises a housing 45, having a chamber 46, which is connected to the tank 41 by means of the conduit 43, within which is operatively mounted the plunger 47, which is biased to its normal outer position, as shown in the drawing, by the springs 48 and 49. The plunger 47 comprises an upper member 50 and a lower member 51 which are retained in their normal spaced relation by the spring 48. The upper spring 48 is heavier than the lower spring 49, so that the spring 49 will compress before the spring 48. The upper member 50 of the plunger 47 projects beyond the housing 45 into the path of the flanges of the wheels of a car passing over the rails 16. The lower plunger member 51 projects into the chamber 46. An adjustable stop 52 is provided to limit the downward stroke of the lower member 51 of the plunger 47. This stop 52, as shown, comprises a stud 53 mounted in the removable plug 54. The plug 54 also provides a seat for the spring 49. Washers 55 are provided for adjusting the stop 52. When the maximum stroke of the lower member 51 of the plunger 47 is required all of the washers 55 are removed from the stop 52 so that the head of the stud 53 will engage the upper face of the plug 54. To reduce the stroke, washers 55 are added to the stud 53 until the desired stroke is attained. The washers 55 when not in use may be attached to the housing 45 by means of a stud 56 as shown in Figure 8. Instead of providing a stud 53 and washers 55 for adjusting the stroke of the plunger, the plug itself may be made so that it can be adjusted by operating it to the required position or different length plugs may be provided to meet predetermined operating conditions. By employing a two-piece plunger 47, as described, which has means for limiting the stroke of its lower member, such as the stop 52, and has the lower and upper members separated by compressible means, its stroke is not affected by wheels having flanges of different depth, as the stop 52 limits the effective stroke and the spring intermediate the upper member 50 and the lower member 51 compresses the required amount to take care of the different depth of flanges without changing the effective stroke of the plunger on the lubricant in the chamber 46.

A passage 58 and a discharge duct 57 lead from the chamber 46 to the outside of the distributor 42. Located intermediate the chamber 46 and the outlet of the duct 57 is the pneumatic control means, which comprises an air chamber 60, and a sump 61 which is adapted to receive a limited supply of lubricant and which is in communication with the passage 58 and the duct 57. An adjustable control 62 is provided for the air chamber 60. The control 62 comprises a control chamber 63, which communicates with the air chamber 60 through the port 64, the entrance to which is controlled by the adjustable valve 65. The control chamber 63 is provided with an air vent 59 which permits air to be supplied thereto, the air in the chamber 63 being normally at atmospheric pressure. The conduit 44 connects the control chamber 63 with the supply tank 41 and permits any lubricant which may be forced to the chamber 63 to be returned to the supply tank 41. The lubricant consumption is controlled by the adjustable valve 65 and the stroke of the plunger member 51. With the valve 65 completely closed, maximum pressure is obtained to eject the lubricant from the duct 57. If less lubricant is desired the valve 65 is turned toward its open position until the desired height and volume of the stream of lubricant discharged from the duct 57 is obtained.

In operation of the lubricator shown in Figures 1 to 5, inclusive, when a train passes over the rail 16, the flange of each wheel engages and depresses the plunger 23, the length of the stroke of the plunger depending on the location of the adjustable washers 25 and 26. The spring 24 returns the plunger 23 to its normal outer position as soon as a car wheel passes thereover, so that it is in position to be depressed by each successive car wheel. Each stroke of the plunger 23 forces a predetermined amount of the lubricant from the chamber 22 through the passage 28 to the pneumatically controlled chamber 27, compressing the air therein to a sufficient extent to force the lubricant therefrom out through the duct 30, the amount of lubricant discharged from the duct 30 depending on the adjustment of the valve 37 and the vent 35, which permits a predetermined amount of air to be forced through the passage 34 into the chamber 33. Air from the chamber 33 is forced out through the vent 35 into the atmosphere. The easier the air can be forced to the atmosphere the smaller will be the force acting on the oil in chamber 27 and therefore the smaller will be the amount of oil discharged through the duct 30. The lubricant discharged from the duct 30 passes onto the car wheel engaging the plunger 23. The pneumatically controlled chamber 27, is so regulated that the predetermined stream of lubricant desired is discharged from the duct 30 onto each of the wheels engaged by the plunger during the passage of the car over the rail to which the lubricator is applied.

The operation of the lubricator shown in Figures 6 to 10, inclusive, is substantially the same as the operation of the lubricator shown in Figures 1 to 5, inclusive, just described, except that the lower member 51 of the plunger 47 will have a constant stroke regardless of the depth of the car wheel flanges, as the member 51 will be depressed the same amount each stroke of the plunger 47 regardless of the increased amount of the depression of the upper member 50, and will, therefore, force the same amount of lubricant from the lubricant chamber 46 regardless of the different depth of the flanges of the wheels of the car passing over the rail. If it is desired to change the stroke of the lower member 51, it is only necessary to change the location of the stop 52.

From the foregoing it is evident that we have devised an efficient lubricator which has the moving parts thereof reduced to a minimum and whereby the amount of lubricant discharged therefrom is governed in a very simple and efficient manner without the use of complicated valves or operating mechanism.

While we have shown our invention in a plurality of forms, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

Having thus described our invention, what we claim as new and desire to secure by Letters Patent is:

1. A rail and flange lubricator comprising a lubricant distributor having a lubricant chamber therein, a plunger operatively mounted within said distributor and having its lower end extending into said chamber and having its upper end projecting outwardly from said distributor and operable, when the distributor is applied to a rail, by the flange of a car wheel passing over said rail, a passage leading from the lubricant chamber to the outside of said distributor to provide means for the discharge of lubricant from said chamber onto the car wheels and the rail, and pneumatic control means in communication with said passage to control the discharge of lubricant from said distributor.

2. A rail and flange lubricator comprising a lubricant distributor having a lubricant chamber therein, a plunger operatively mounted in said distributor and having its lower end extending into said chamber and projecting outwardly from said distributor and operable, when the lubricator is applied to a rail, by the flange of a car wheel passing over said rails, a passage leading from the lubricant chamber to the outside of said distributor to provide means for the discharge of lubricant from said chamber onto the car wheels and the rail, and pneumatic control means in communication with said passage to control the discharge of lubricant from said distributor, said pneumatic control means comprising an air chamber and control means for said air chamber.

3. A rail and flange lubricator comprising a lubricant distributor having a lubricant chamber therein, a plunger operatively mounted in said distributor and having its lower end extending into said chamber and projecting outwardly from said distributor and operable, when the lubricator is applied to a rail, by the flange of a car wheel passing over said rails, a passage leading from the lubricant chamber to the outside of said distributor to provide means for the discharge of lubricant from said chamber onto the car wheels and the rail, and pneumatic control means in communication with said passage to control the discharge of lubricant from said distributor, said pneumatic control means comprising an air chamber and adjustable control means for said air chamber.

4. A pneumatic rail and flange lubricator comprising a lubricant supply, a lubricant distributor adapted to be applied to a rail and having a lubricant chamber constantly in communication with said lubricant supply, a plunger operatively mounted in said distributor and having its lower end extending into said chamber and having its upper end projecting outwardly from said distributor, and adapted when the distributor is applied to a rail to project into the path of a car wheel passing over the rail so that the car wheels will operate said plunger, an air chamber in said distributor having a sump therein to receive a limited quantity of lubricant, and a passage communicating the lubricant chamber with said air chamber, a duct in said distributor in communication with said air chamber providing a passage for the discharge of lubricant from said chamber to the wheels of a car passing over the rail, and a control for said air chamber.

5. A pneumatic rail and flange lubricator comprising a lubricant supply, a lubricant distributor adapted to be applied to a rail and having a lubricant chamber constantly in communication with said lubricant supply to receive lubricant from said lubricant supply, a plunger operatively mounted in said distributor and having its lower end extending into said chamber and having its upper end projecting outwardly from said distributor and adapted when the distributor is applied to a rail to extend into the path of and to be operated by the flange of a car wheel passing over the said rail, a pneumatic control comprising an air chamber having a sump therein adapted to receive a supply of lubricant located in said distributor at a greater elevation than said lubricant chamber, a passage communicating the lubricant chamber with said air chamber, a duct in communication with said air chamber and leading to the outside of said distributor to provide means for the passage of lubricant from the distributor to the flange of a car wheel passing over the rail, and a control chamber for said air chamber having a passage leading to said air chamber.

6. A pneumatic rail and flange lubricator comprising a lubricant supply, a lubricant distributor adapted to be applied to a rail and having a lubricant chamber constantly in communication with said lubricant supply to receive lubricant from said lubricant supply, a plunger operatively mounted in said distributor and having its lower end extending into said chamber and having its upper end projecting outwardly from said distributor and adapted when the distributor is applied to a rail to extend into the path of and to be operated by the flange of a car wheel passing over the said rail, a pneumatic control comprising an air chamber having a sump therein adapted to receive a supply of lubricant located in said distributor at a greater elevation than said lubricant chamber, a passage communicating the lubricant chamber with said air chamber, a duct in communication with said air chamber and leading to the outside of said distributor to provide means for the passage of lubricant from the distributor to the flange of a car wheel passing over the rail, and a control chamber for said air chamber having a passage leading to said air chamber and an adjustable valve controlling said passage to regulate the pressure in said air chamber to control the volume and height of the stream of lubricant discharged from the said duct.

7. A pneumatic rail and flange lubricator comprising a lubricant supply, a lubricant distributor, adapted to be applied to a rail, and having a chamber constantly in communication with said lubricant supply, a plunger operatively mounted in said distributor and having its lower end extending into said chamber and having its upper end projecting outwardly from said distributor and adapted to be operated by a car wheel passing over the rail to which it is applied, and means for adjusting the stroke of said plunger, an air chamber in said distributor having a sump therein to receive a limited supply of lubricant, a passage communicating the lubricant chamber with said air chamber, a duct in said distributor in communication with said air chamber providing a passage for the lubricant from said chamber to the wheels of a car passing over the rail to which the lubricator is applied, and control means for said air chamber.

8. A pneumatic rail and flange lubricator comprising a lubricant supply, a lubricant distributor, adapted to be applied to a rail, and having a chamber constantly in communication with said lubricant supply, a plunger operatively mounted in said distributor and having its lower end extending into said chamber and having its upper end projecting outwardly from said distributor and adapted to be operated by a car wheel passing over the rail to which it is applied, and means for adjusting the stroke of said plunger, an air chamber in said distributor having a sump therein to receive a limited supply of lubricant, a passage communicating the lubricant chamber with said air chamber, a duct in said distributor in communication with said air chamber providing a passage for the lubricant from said chamber to the wheels of a car passing over the rail to which the lubricator is applied, and control means for said air chamber, a passage connecting said air chamber and said control means and adjustable means controlling said passage, said adjustable means and the adjusting means for said plunger constituting regulating means to control the volume and the height of lubricant discharged from the duct onto the car wheels upon the operation of the plunger by said wheels.

9. A pneumatic rail and flange lubricator comprising a lubricant supply, a lubricant distributor, adapted to be applied to a rail, and having a chamber constantly in communication with said lubricant supply, a plunger operatively mounted in said distributor and having its lower end extending into said chamber and having its upper end projecting outwardly from said distributor and adapted to lie in the path of a car wheel passing over the rail to which it is applied, means for maintaining a constant stroke of the lower end of said plunger, a duct open to the outside of said distributor to provide a passage for the discharge of lubricant from said distributor to the wheels of a car passing over the rail, and pneumatic control means intermediate said plunger chamber and said duct and regulating means for said pneumatic control.

10. A pneumatic rail and flange lubricator comprising a lubricant supply and a lubricant distributor adapted to be applied to a rail, and having a chamber constantly in communication with said lubricant supply, a plunger operatively mounted in said distributor and having its lower end extending into said chamber and having its upper end projecting outwardly from said distributor and adapted to lie in the path of a car wheel passing over the rail to which it is applied, means for regulating the stroke of said plunger, a duct open to the outside of said distributor to provide a passage for the discharge of lubricant from said distributor to the wheels of a car passing over the rail, an air chamber intermediate said plunger chamber and said duct and in communication with said plunger chamber and said duct, and means for regulating the supply of air to said air chamber.

11. A pneumatic rail and flange lubricator comprising a lubricant supply and a lubricant distributor adapted to be applied to a rail, and having a chamber constantly in communication with said lubricant supply, a plunger operatively mounted in said distributor and having its lower end extending into said chamber and having its upper end projecting outwardly from said distributor and adapted to lie in the path of a car wheel passing over the rail to which it is applied, means for regulating the stroke of said plunger, a duct open to the outside of said distributor to provide a passage for the discharge of lubricant from said distributor to the wheels of a car passing over the rail, an air chamber intermediate said plunger chamber and said duct and in communication with said plunger chamber and said duct, and means for regulating the supply of air to said air chamber, said means comprising a control chamber having a passage therefrom communicating with said air chamber and adjusting means for said passage and for said control chamber.

12. A pneumatic rail and flange lubricator comprising a lubricant supply, a lubricant distributor adapted to be applied to a rail and having a chamber in communication with said lubricant supply to receive lubricant from said lubricant supply, a plunger operatively mounted in said lubricator and having its lower end projecting into said chamber and having its upper end projecting outwardly from said housing and adapted to lie in the path of the flange of a car wheel passing over the rail to which the distributor is attached, an air chamber having an oil sump therein, a passage connecting the lubricant chamber and said air chamber for the passage of lubricant from said lubricant chamber to the sump in said air chamber, a control chamber, a passage communicating said control chamber with said air chamber, an adjustable valve controlling the passage between said chambers, and a duct in communication with said air chamber and leading to the outside of the lubricator from which lubricant is adapted to be discharged onto the car wheels and the rail upon the operation of the plunger by the car wheels passing over the rail to which said lubricator is applied.

13. A pneumatic rail and flange lubricator comprising a lubricant supply, a lubricant distributor attachable to a rail, said distributor comprising a housing having a lubricant chamber therein, a plunger operatively mounted in said housing and having its lower end extending into said chamber and its upper end projecting outwardly from the housing and adapted to lie in the path of the flange of a car wheel passing over the rail to which the lubricator is applied, a conduit intermediate the lubricant supply and said lubricant distributor to supply lubricant to said chamber beneath the said plunger, an air chamber having a lubricant sump therein, a passage connecting said lubricant chamber and said air chamber for the passage of lubricant from said chamber to said sump, a control chamber, an air vent communicating said control chamber to the atmosphere, adjusting means for said air vent, a passage communicating said control chamber with said air chamber, adjustable means controlling the passage between said chambers, and a discharge duct in communication with said air chamber and leading to the outside of the distributor from which lubricant is adapted to be discharged from the distributor onto the car wheels and the rail upon the operation of the plunger by the flange of a car wheel passing over the rail to which said lubricator is attached.

14. A rail and flange lubricator comprising a lubricant distributor having a main lubricant chamber and an auxiliary lubricant chamber, a plunger operatively mounted in said distributor and extending into said main chamber and projecting outwardly from said distributor, and adapted to be operated, when the distributor is applied to a rail, by a car wheel passing over said rail, a passage leading from the main chamber to the auxiliary chamber, a discharge outlet for said distributor in communication with said auxiliary chamber and an air chamber for controlling the lubricant discharged through the discharge outlet from said auxiliary chamber onto the car wheels passing over the rail upon the operation of said plunger by said car wheels.

15. A rail lubricator comprising a main lubricant chamber, a plunger operatively mounted in said chamber adapted to be operated by a car wheel, an auxiliary chamber in communication with the main chamber, a discharge outlet for said auxiliary chamber and pneumatic control means for said distributor comprising an air chamber in communication with said auxiliary chamber and control means for said air chamber.

16. A rail lubricator comprising a main lubricant chamber, a plunger operatively mounted in said chamber adapted to be operated by a car wheel, an auxiliary chamber in communication with the main chamber, a discharge outlet for said auxiliary chamber and pneumatic control means for said distributor comprising an air chamber in communication with said auxiliary chamber and control means for said air chamber, said control means comprising an auxiliary air chamber and adjustable means intermediate the air chambers.

GEORGE LOOP MOORE.
JAMES ROBERT STEELE.